United States Patent [19]
Ackermann et al.

[11] 4,083,297
[45] Apr. 11, 1978

[54] ARRANGEMENT FOR PROTECTING THE NEEDLES OF THE TYING MECHANISM OF A BALER

[75] Inventors: Gustav Ackermann, Marienfeld; Gerhard Clostermeyer, Guetersloh, both of Germany

[73] Assignee: Gebr. Claas Maschinenfabrik GmbH, Harsewinkel, Westfalen, Germany

[21] Appl. No.: 703,567

[22] Filed: Jul. 8, 1976

[30] Foreign Application Priority Data
Jul. 9, 1975 Germany .............................. 7521769

[51] Int. Cl.² ............................................. B65B 13/08
[52] U.S. Cl. .................................................. 100/19 R
[58] Field of Search ................... 100/19, 19 A, 20, 21, 100/22, 23, 24, 53

[56] References Cited
U.S. PATENT DOCUMENTS
947,039 1/1910 Hart ................................... 100/19 R FOREIGN PATENT DOCUMENTS
837,518 6/1960 United Kingdom .............. 100/19 R
869,017 9/1975 United Kingdom .............. 100/19 R

*Primary Examiner*—Billy J. Wilhite
*Attorney, Agent, or Firm*—Michael J. Striker

[57] ABSTRACT

In a baler wherein material to be baled is displaced along a path past a plurality of needles into a baling chamber and wherein tying mechanism periodically displaces the needles in a predetermined direction across the path, a pair of shields are provided flanking each of the needles and displaceable in the same direction as the needles by links connected to the tying mechanism so as to force a way through material in the passage for the needles and thereby prevent bending of these needles. The shields are formed as circle segments pivotal about an axis immediately below the path and below the axis about which the needles are pivoted.

10 Claims, 2 Drawing Figures

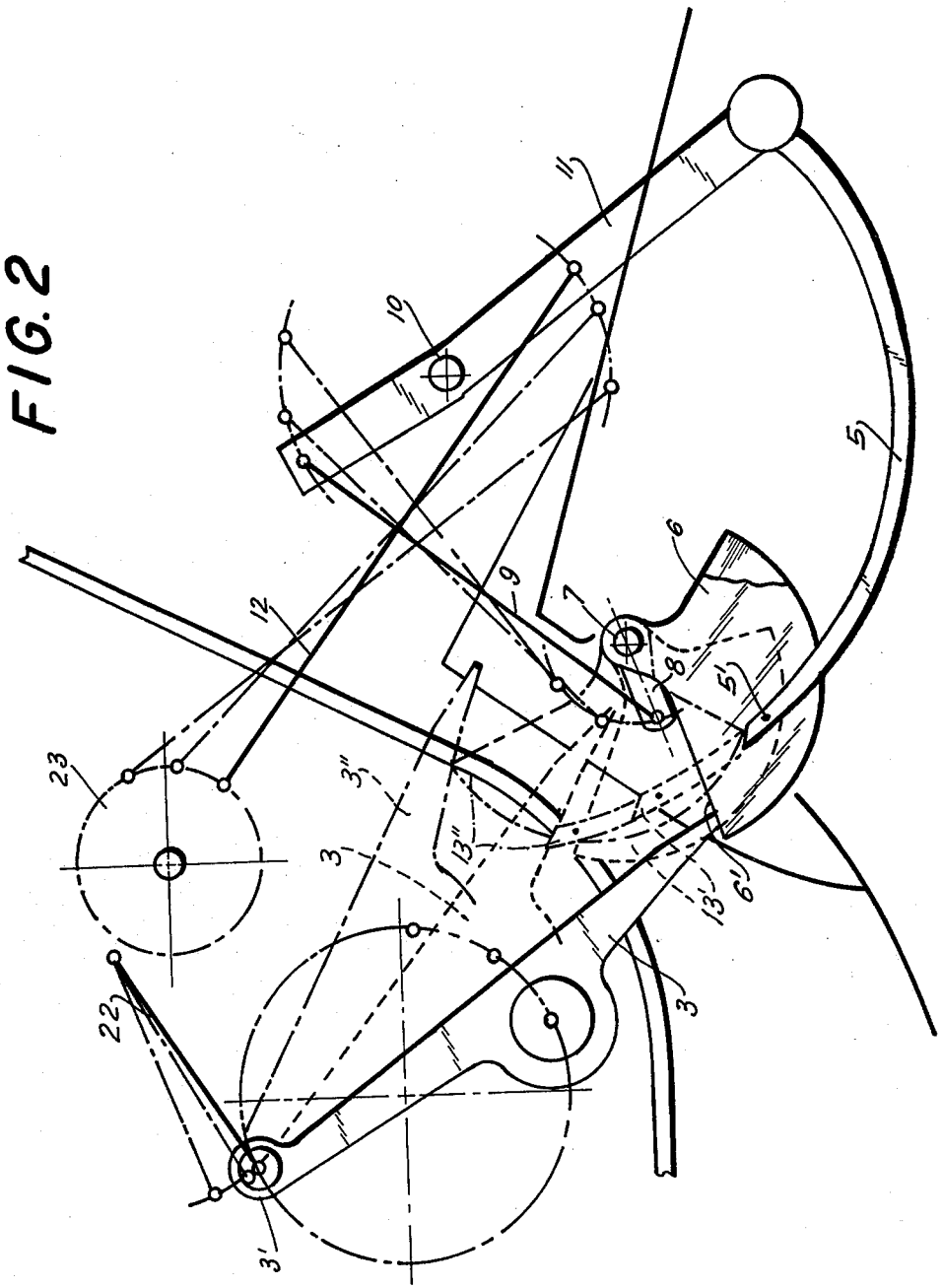

ARRANGEMENT FOR PROTECTING THE NEEDLES OF THE TYING MECHANISM OF A BALER

BACKGROUND OF THE INVENTION

The present invention relates to a baler. More particularly this invention concerns a binding or tying arrangement for use in a so-called big-bale machine which produces large cylindrical bales tied circumferentially with twine or wire.

A type of baler is known which picks the cut crop, hay, alfalfa, or the like, up off the ground and advances it along a path into a bale-forming chamber. A plurality of tines is reciprocal along this path in order to advance the material along it, these tines also serving to precompress the material to be baled.

In such an apparatus once the requisite quantity of material is present in the baling chamber a plurality of needles are displaced across the path each pulling a respective baling twine or wire. These twines or wires are looped around the mass of material in the baling chamber so that, once they have been passed across the path, they can be tightened and tied off. Then the thus-tied bale can be ejected from the baling chamber, the needles can be withdrawn back across the feed path, and the next bale can be formed. It is therefore necessary in such devices to stop the material feed at least during the period when the needles cross the path. Even so a frequent occurrence is that the needles are deflected by the material in the path so that the tying mechanism cannot seize the end of the twine held by the needle and properly tie it off. Furthermore the needles are frequently bent to the point where the entire machine must be shut down and the needles either bent back to their proper positions or replaced before the baling operation can continue.

It has been suggested in a down pressing type of baler to protect the needles when they project into the pressing chamber by means of segment shields. The disadvantage of this arrangement is that the needles are not protected at all times by the shields. The shields are displaced in an opposite direction to the displacement direction of the needles so that the mass of material must be at least partially separated by the needles on one side and the shields on the other. This arrangement has some application to balers which produce a parallelepipedal bales, but cannot be used with the above-described ball-type baler. See French Pat. No. 1,161,838, British Pat. No. 837,518 and 1,244,302 and German Auslegeschrift No. 1,782,382.

SUMMARY OF THE INVENTION

It is therefore an object of the present invention to provide an improved baler.

Another object is the provision of such a baler wherein the possibility of the needles bending as they are passed across the transport path for the material being baled is greatly reduced.

Yet another object is to provide an improved baler which can operate at high speed with continuous feed of the material being baled.

These objects are attained according to the present invention in a baler of the above-described general type wherein at least one shield is provided adjacent each of the needles and displaceable in the displacement direction of the needles across the path, and link means connects these shields with the tying mechanism of the baler for joint displacement of the needles and their respective shields across the path. Thus in accordance with the present invention the shields force a way through the material for the needles and thereby prevent bending of these needles.

In accordance with further features of this invention a pair of such shields flank each of the needles and are jointly displaceable in the displacement direction with the needles. Each of these shields is substantially more rigid than the needles and is so connected that the shields advance across the conveyor path ahead of the respective needles, so that these needles effectively move in the wake of these shields which are formed as circle segments.

According to yet another feature of this invention the shields are all pivoted about an axis lying immediately under the path and the needles are pivotal about an axis above the shield axis.

The baler is provided with a plurality of feed tines which are reciprocal along the path and so displaceable that they enter the path and move along it to advance the material into the baling chamber, then withdraw laterally from the path, move back to a starting position, and then reinsert themselves into the path to continuously advance the material to be baled. According to this invention a common drive is provided for the needles, the segments, and these tines. All of these elements are positively linked together by rigid links so that they all move synchronously and the link operating the tines is connected so that these tines are withdrawn from the conveyor path as the shields and needles are displaced across the conveyor path.

With the baler according to the present invention it is therefore possible to form large cylindrical bales relatively rapidly virtually without stopping the baler and with no danger to the needles. The segments serve not only to protect the needles, but to partially precompress the material of the bale so that the baling operation can be carried out relatively rapidly and continuously.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

FIG. 2 is a large-scale partly diagrammatic view of a detail of the baler of FIG. 1.

DESCRIPTION OF A PREFERRED EMBODIMENT

Figure 1:
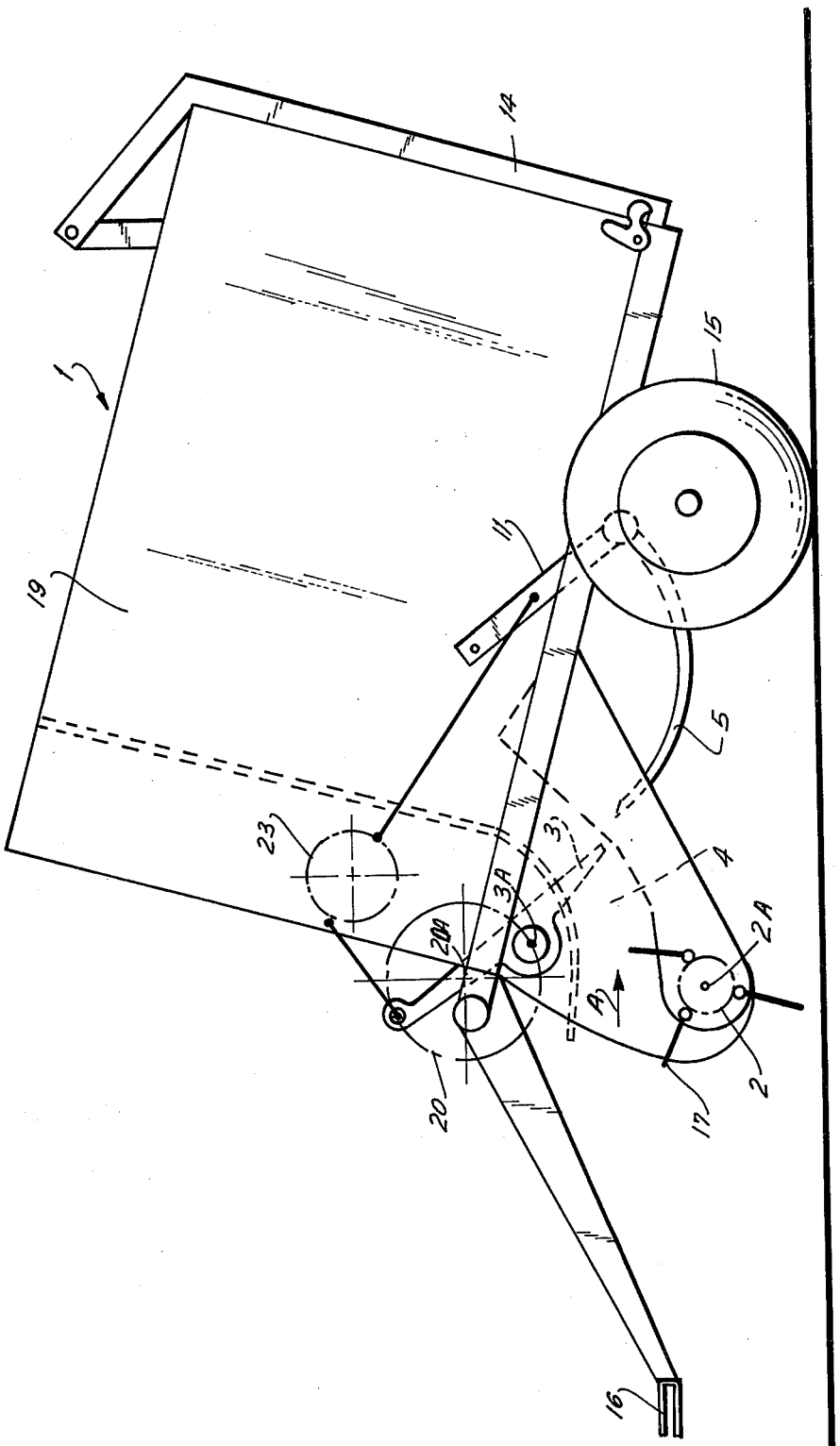
FIG. 1 is a side view of a baler in accordance with the present invention.

As shown in FIG. 1 a ball-type baler 1 is provided with wheels 15 for rolling of the baler 1 along the ground and has a trailer connection 16 adapted to be secured to the back of a tractor or other prime mover. This baler 1 is provided with a drum 2 having a plurality of tines 17 and rotatable about a horizontal axis 2A above the ground 18 so as to pick up cut crop lying on the ground 18 and feed it into a passage 4 leading back to a baling chamber 19. A plurality of advancing tines 3 are provided which are centrally pivoted at 3A on a wheel 20 which is continuously rotated about its central axis 20A offset from the axes 3A. In addition each of these tines 3 as also shown in FIG. 2 has a far end 3' connected to a link 22. Thus rotation of the disc 20 carrying the tines 3 will cause them to enter the chute or passage 4 at the upstream end, advance along this chute or passage 4 in the direction indicated by arrow A, then withdraw laterally from the passage 4 and move back in a direction counter this direction A. Then the tines 3 will re-enter the passage 4 and move along in the direction A so as to move the crop picked up by the tines 17 backwardly into the chamber 19.

The disc 23 of the typing mechanism is connected via a link 12 to a support 11 pivotal on the machine 1 about a horizontal axis 10 passing through the chamber 19. This support 11 carries a plurality of arcuate needles 5 having holes 5' at their pointed forward ends adapted to receive baling twine or wire. Thus rotation of the element 23 will pivot the needles 5 about the axis 10 and cause them to pass transversely across the path defined by the passage 4 so that they carry the respective twine or wire across this passage. This advance of the needles across the passage is effected periodically when sufficient crop is present in the chamber 19 to form a bale of the desired size. After the needles 5 have crossed the passage the twine or wire held thereby is tied together to form a tight bale that is then dropped out of the back of the baler 1 through the rear door 14.

Flanking each of the needles 5 is a pair of circularly segmental shields 6 formed as relatively heavy metal plates which are substantially more rigid and less flexible than the needles 5. These plates 6 are all carried on a common axis 7 parallel to the pivot axle 10 of the needles 5 and lying immediately below the passage 4. In addition the axle 7 is provided with radially extending arms 8 connected via at least one link 9 to the support 10 so that when the needles 5 move across the passage 4 transverse to the direction A the shields 6 will also move across the passage 4, forcing apart any crop in this passage so that the needles are not damaged thereby. The length of the arm 8 and the kinematics of the system are such that the shields 6 advance with their leading edges 6' ahead of the points of the needles 5. Thus the needles 5 and shields 6 are in the positions indicated at 13' and thereafter in the positions indicated at 13", these needles 5 always being behind the leading edges 6' of the shields 6.

With this system, therefore, bending of the needles due to contact with the crop in the passage 4 is altogether ruled out since the shields 6 move in the same direction as the needles 5 to force a way for them through any material in the passage 4, while any tines in the vicinity are moved backwardly against the direction A further to aid in the formation of a gap through which the needles 5 can pass. When the shields 6 and needles 5 are in the positions shown in dashed lines at 13' the tines 3 lie in the position shown at 3' and when in the positions indicated at 13" they are in the positions shown at 3".

It will be understood that each of the elements described above, or two or more together, may also find a useful application in other types of constructions differing from the types described above.

While the invention has been illustrated and described as embodied in a baler, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a baler wherein material to be mailed is displaced along a path past a plurality of needles into a baling chamber and wherein tying mechanism periodically displaces said needles in a predetermined direction and along predetermined parallel trajectories across said path, the improvement comprising:
    at least one shield adjacent each of said needles and displaceable in said direction and along the respective trajectory completely across said path; and
    link means between said shields and said tying mechanism for joint displacement of said needles and their respective shields along said trajectories completely across said path with said shields moving ahead of said needles and thereby forcing a way completely through said material for said needles and preventing bending of said needles.

2. The improvement defined in claim 1, wherein a pair of said shields flank each of said needles and are jointly displaceable in said direction therewith.

3. The improvement defined in claim 2, wherein each of said shields is substantially more rigid than the respective needle.

4. The improvement defined in claim 3, wherein said shields are segment plates pivotal about an axis on said baler.

5. The improvement defined in claim 4, wherein said axis lies immediately below said path.

6. The improvement defined in claim 4, wherein said link means includes a rigid link connected to said tying mechanism for advancing said shields in said direction across said path ahead of said needles.

7. The improvement defined in claim 6, wherein said needles are pivotal about a needle axis above the shield axis.

8. The improvement defined in claim 7, wherein said baler is provided with feed tines reciprocal along said path and with means for reciprocating said tines for advancing said material along said path.

9. The improvement defined in claim 8, wherein each needle is formed at its front end relative to said direction with a throughgoing hole adapted to receive a baling twine or wire.

10. The improvement defined in claim 9, wherein said shields are jointly pivotal about said shield axis and said link means includes a short arm extending radially of said axis, said link being connected to the free end of said arm.

* * * * *